United States Patent
Vijayaraghavan et al.

(10) Patent No.: US 8,800,530 B2
(45) Date of Patent: Aug. 12, 2014

(54) STRATIFIED CHARGE PORT INJECTION ENGINE AND METHOD

(75) Inventors: Shriram Vijayaraghavan, Evanston, IL (US); David Montgomery, Edelstein, IL (US)

(73) Assignee: Caterpillar Inc., Peoria, IL (US)

( * ) Notice: Subject to any disclaimer, the term of this patent is extended or adjusted under 35 U.S.C. 154(b) by 251 days.

(21) Appl. No.: 13/251,141

(22) Filed: Sep. 30, 2011

(65) Prior Publication Data

US 2012/0160213 A1 Jun. 28, 2012

Related U.S. Application Data

(60) Provisional application No. 61/426,430, filed on Dec. 22, 2010.

(51) Int. Cl.
  *F02B 31/08* (2006.01)
  *F02B 31/00* (2006.01)

(52) U.S. Cl.
  USPC ............................ 123/308; 123/432; 701/103

(58) Field of Classification Search
  USPC ......... 123/308, 432, 445, 527, 528, 276, 279, 123/90.15–90.18; 701/101–103
  See application file for complete search history.

(56) References Cited

U.S. PATENT DOCUMENTS

| | | | |
|---|---|---|---|
| 4,669,434 A | 6/1987 | Okumura et al. | |
| 4,742,804 A * | 5/1988 | Suzuki et al. | 123/256 |
| 4,834,048 A | 5/1989 | Adamis et al. | |
| 4,998,513 A | 3/1991 | Gagnon | |
| 5,291,865 A * | 3/1994 | Sasaki | 123/298 |
| 5,551,392 A * | 9/1996 | Yamaji et al. | 123/306 |
| 5,755,210 A * | 5/1998 | Sato et al. | 123/518 |
| 5,765,525 A * | 6/1998 | Ma | 123/308 |
| 6,612,285 B2 * | 9/2003 | Ganoung | 123/308 |
| 7,730,874 B2 | 6/2010 | Leduc et al. | |
| 2001/0018904 A1 | 9/2001 | Suzuki et al. | |
| 2009/0093949 A1 | 4/2009 | Boyer et al. | |
| 2009/0145382 A1 * | 6/2009 | Kawai | 123/90.16 |

FOREIGN PATENT DOCUMENTS

| | | |
|---|---|---|
| DE | 10002486 A1 | 7/2001 |
| GB | 1078260 A | 8/1967 |
| JP | 05-133307 A | 5/1993 |
| JP | 11-93712 A | 4/1999 |
| JP | 2006-002608 A | 1/2006 |
| WO | 00-29731 A1 | 5/2000 |

* cited by examiner

*Primary Examiner* — Mahmoud Gimie
(74) *Attorney, Agent, or Firm* — Leydig, Voit & Mayer, Ltd.

(57) ABSTRACT

An internal combustion engine includes a combustion chamber at least partially defined within a cylinder bore by a reciprocating piston having a piston crown. An intake plenum is fluidly connectable with the combustion chamber and at least one intake port is configured to fluidly connect the intake plenum with the combustion chamber. At least one intake valve is configured to selectively fluidly connect the intake plenum with the combustion chamber. The combustion chamber is configured to receive a lean air/fuel mixture therein to substantially fill the combustion chamber. The combustion chamber is further configured to receive a rich air/fuel mixture therein that yields a stratified total air/fuel mixture within the combustion chamber.

19 Claims, 6 Drawing Sheets

STRATIFIED CHARGE PORT INJECTION ENGINE AND METHOD

TECHNICAL FIELD

This patent disclosure relates generally to internal combustion engines and, more particularly, to spark ignition internal combustions having port fuel injection.

BACKGROUND

Spark ignition engines, such as natural gas burning engines, are typically four stroke engines operating under an Otto or Miller combustion cycle. Given the relatively low energy content of natural gas versus other types of fuel, such as gasoline or diesel, natural gas burning engines of the reciprocating piston type may produce unburned hydrocarbon emissions and tend to knock during operation. As is known, engine knocking, which is a phenomenon also commonly referred to as pinging or pinking, in spark-ignition internal combustion engines occurs when combustion of the air/fuel mixture in the cylinder does not combust in a single combustion event. More particularly, in a typical knock situation, the air/fuel mixture in a combustion cylinder will initiate combustion in response to ignition by the spark plug, but one or more pockets of air/fuel mixture will combust outside the envelope of the normal combustion or flame front. These secondary or additional combustion areas occurring within a combustion cylinder may create pressure waves within the cylinder, which can dramatically increase cylinder pressure. Such increases in cylinder pressure can be detrimental to the service life and durability of various engine components because they increase the stresses and loading on the various components.

SUMMARY

The disclosure describes, in one aspect, an internal combustion engine. The internal combustion engine includes a combustion chamber at least partially defined within a cylinder bore by a reciprocating piston having a piston crown. An intake plenum is fluidly connectable with the combustion chamber and at least one intake port is configured to fluidly connect the intake plenum with the combustion chamber. At least one intake valve is configured to selectively fluidly connect the intake plenum with the combustion chamber. The combustion chamber is configured to receive a lean air/fuel mixture to substantially fill the combustion chamber. The combustion chamber is further configured to receive a rich air/fuel mixture that yields a stratified total air/fuel mixture within the combustion chamber.

In another aspect, the disclosure describes an internal combustion engine that includes a plurality of cylinders, each of which contains a reciprocable piston having a piston crown and defining a combustion chamber. Each combustion chamber is fluidly connected to an intake plenum by a first intake port having a first intake valve and by a second intake port having a second intake valve. The first and second intake valves are configured to selectively fluidly connect the combustion chamber with the intake plenum. The engine further includes a fuel injector associated with the second intake port and configured to selectively deliver a gaseous fuel into the second intake port. The fuel mixes with air passing through the second intake port to form a rich air/fuel mixture that enters the combustion chamber when the second intake valve is at least partially open. An ignition device protrudes into the combustion chamber. A piston bowl defined on the piston crown is configured to direct the rich air/fuel mixture towards the ignition device. The first intake valve is configured to operate independently from the second intake valve such that air or a lean air/fuel mixture is provided to fill the combustion chamber through the first intake port when the first intake valve is open. The rich air/fuel mixture provided to the combustion chamber when the second intake valve is open is directed by the piston bowl towards the ignition device to create a stratified air/fuel charge in the combustion chamber prior to ignition.

In yet another aspect, the disclosure describes a method for operating an internal combustion engine. The method includes opening a first intake valve to fluidly connect an intake air plenum of the engine to a combustion chamber via a first intake port. Air or a lean air/fuel mixture is provided to the combustion chamber via the first intake port. A second intake valve is opened to fluidly connect the intake air plenum with the combustion chamber via a second intake port. A fuel injector configured to inject a gaseous fuel into the second intake port is activated such that air passing through the second intake port is mixes with fuel injected into the second intake port to form a rich air/fuel mixture. The rich air/fuel mixture is provided to the combustion chamber via the second intake port when the second intake valve is at least partially open. The first and second intake valves are closed before igniting a fuel/air mixture present in the combustion chamber.

DETAILED DESCRIPTION

Figure 1:
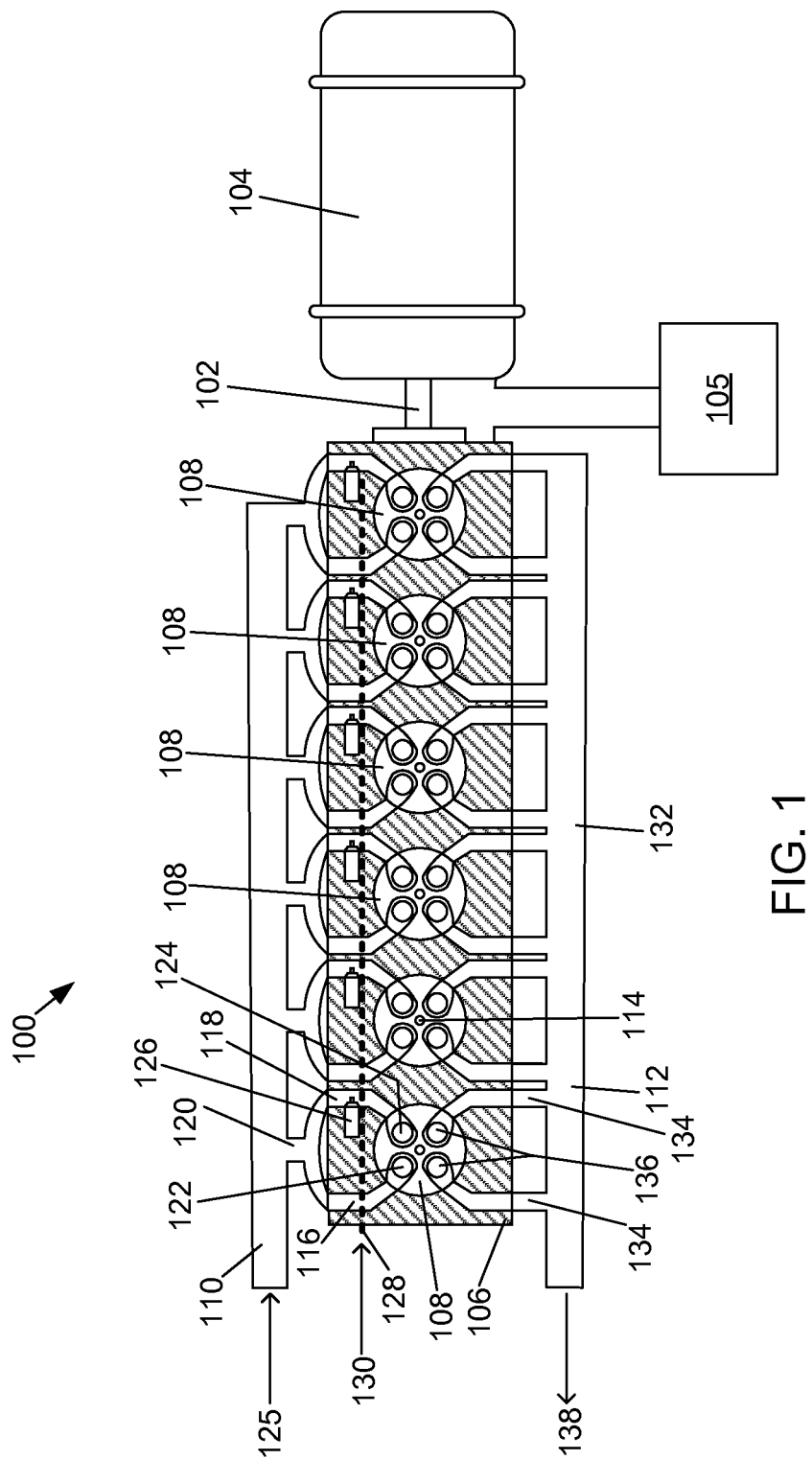
FIG. 1 is a block diagram of an internal combustion engine having a port injected fuel configuration in accordance with the disclosure.

FIG. 1 is a block diagram representation of an internal combustion engine 100 in accordance with the disclosure. As shown, the engine 100 is a stationary engine that is part of a generator set. Thus, the engine 100 has an output shaft 102 connected to a generator 104. During operation, the engine 100 may operate at a nearly constant engine speed but at a varying load depending on the electrical power or current output of the generator 104. A controller 105 may be operably associated with various engine and/or generator systems. The controller 105 in the illustrated embodiment includes operable connections to various sensors and systems of the engine 100 and generator 104, and is configured to receive information on the operating parameters thereof as well as send commands to various actuators and systems through the connections.

The engine 100 may include various components and systems, such as lubrication and electrical systems, which have been omitted from FIG. 1 for simplicity. Relevant to the present disclosure, the engine 100 includes a crankcase 106 having one or more combustion cylinders 108 formed therein. Although six cylinders 108 are shown in an inline configuration, any other number of cylinders arranged in different configurations, such as a "V" configuration, may be used.

Each cylinder 108 includes a reciprocable piston defining a combustion chamber that is connectable to an intake manifold 110 and an exhaust manifold 112. Each cylinder 108 includes a spark plug 114. The spark plugs 114 are configured to produce one or more sparks in each combustion chamber in response to appropriate commands from the controller 105 during engine operation. For example, the controller 105 may be configured to receive timing information from the engine 100, which is used to determine the appropriate ignition timing for each combustion cylinder.

The spark provided by each spark plug 114 causes the combustion of an air/fuel mixture present in a compressed state in each cylinder 108. Each cylinder 108 is configured to selectively receive air from the intake manifold 110, which may be at or below atmospheric pressure for a naturally aspirated engine, or may alternatively be under positive gage pressure in a turbocharged or supercharged engine. In the illustrated embodiment, the engine 100 includes a turbocharger (not shown) that is fluidly connected in the known configuration between the intake and exhaust manifolds 110 and 112.

During operation, air from the intake manifold 110 is provided to each cylinder 108 via, respectively, first and second intake ports 116 and 118. The first and second intake ports 116 and 118 of each cylinder 108 may be directly connected to an intake plenum volume 120 of the intake manifold 110 or may alternatively be branches of a combined intake port (not shown) that is fluidly open to the intake plenum volume 120. A first intake valve 122 is disposed to fluidly isolate the cylinder 108 from the first intake port 116, and a second intake valve 124 is similarly disposed to fluidly isolate the cylinder 108 from the second intake port 118. When the first and second intake valves 122 and 124 are closed, such as during combustion of the air/fuel mixture in the cylinder 108, fluid communication between each respective cylinder 108 and the intake manifold 110 is blocked. Similarly, at least partial opening of either the first and/or second intake valve(s) 122 and 124 permits the fluid communication of the cylinder 108 with the intake plenum volume 120 such that air 125 may enter the cylinder 108.

Fuel is provided to each cylinder 108 by a corresponding fuel injector 126. In the illustrated embodiment, each cylinder 108 is associated with a dedicated fuel injector 126 but, alternatively, a single or fewer fuel injectors may be used. As shown, each fuel injector 126 is disposed to deliver fuel in each corresponding second intake port 118 of each cylinder 108. The fuel injectors 126 are configured to deliver a predetermined mass or volume amount of fuel, such as fuel in a gaseous phase, into the second intake ports 118 as air is passing therethrough. The fuel injectors 126 are associated with a fuel line 128 disposed to deliver fuel 130 to the injectors at a predetermined pressure. The duration of each injection event and, thus, the amount of fuel injected is configured to be conducted in response to a fuelling command provided by the electronic controller 105 to each injector 126 via an appropriate communication line (not shown).

When a particular injector 126 is activated to provide a predetermined amount of fuel, the fuel provided is carried into the cylinder 108 by an airflow passing through each respective second intake port 118 while the second intake valve 124 is open. The air/fuel mixture entering the cylinder 108 through the second intake port 118, which may be rich, in addition to a relatively lean air/fuel mixture entering the cylinder 108 via the first intake port 116, combusts when a spark is provided by the corresponding spark plug 114. The combustion, as is known, produces power, which is transferred to the output shaft 102 to drive the generator 104.

Exhaust gas remaining after the combustion of fuel from each injector 126 with air from the first and second intake ports 122 and 124 within each cylinder 108 is evacuated and collected in the exhaust manifold 112. In the illustrated embodiment, each cylinder 108 is fluidly connectable to an exhaust plenum volume 132 via two exhaust ports 134. Each exhaust port 134 is fluidly isolatable from the cylinder 108 by a corresponding exhaust valve 136. The exhaust gas 138 collected is removed from the exhaust manifold 112. Although two exhaust valves 136 are shown corresponding to each cylinder 108, a single exhaust valve disposed in a single exhaust port per cylinder 108 may be used.

Figure 2:
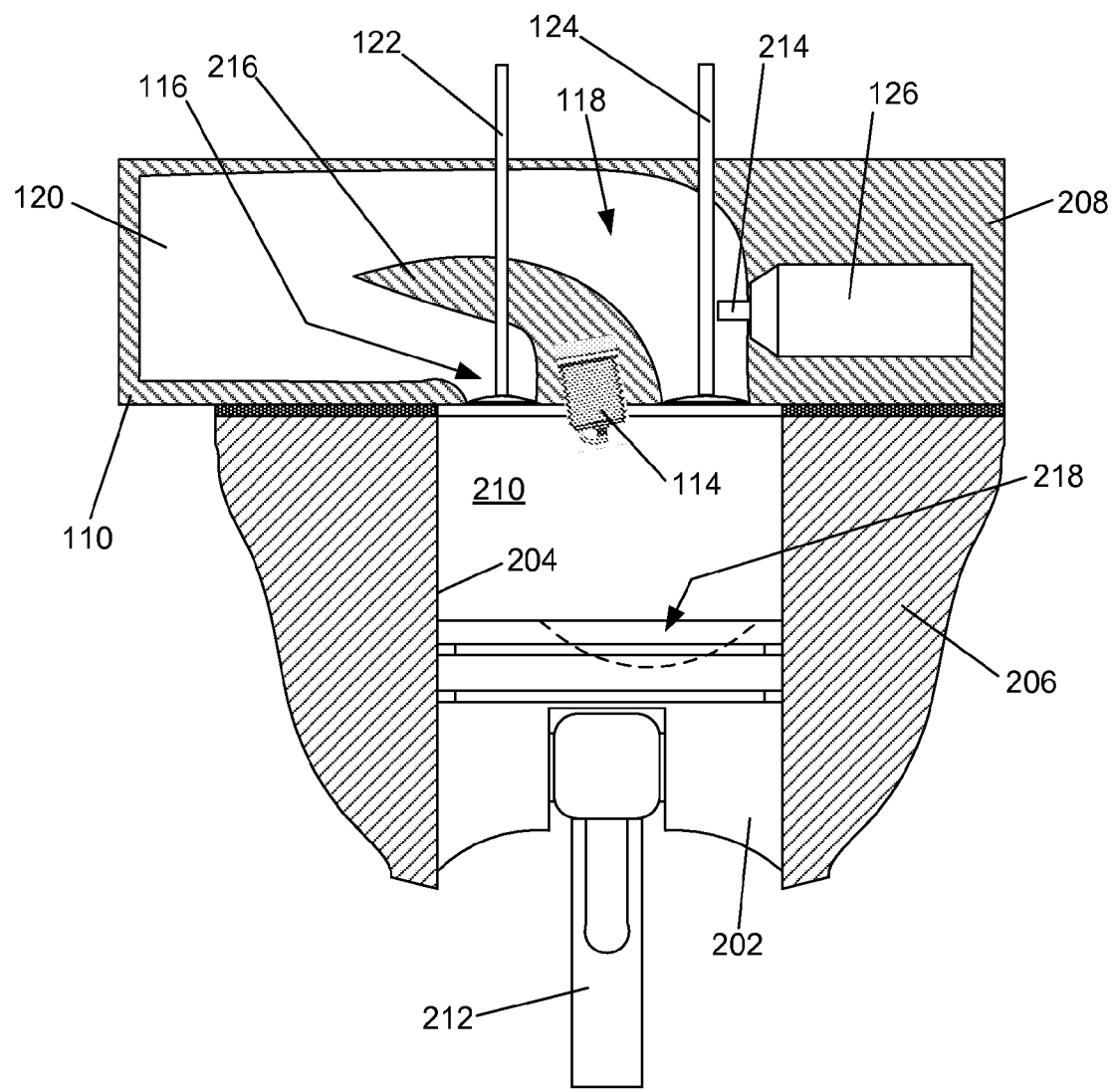
FIGS. 2-4 are cross sections of a combustion cylinder configuration at different operating conditions in accordance with the disclosure.
Figure 3:
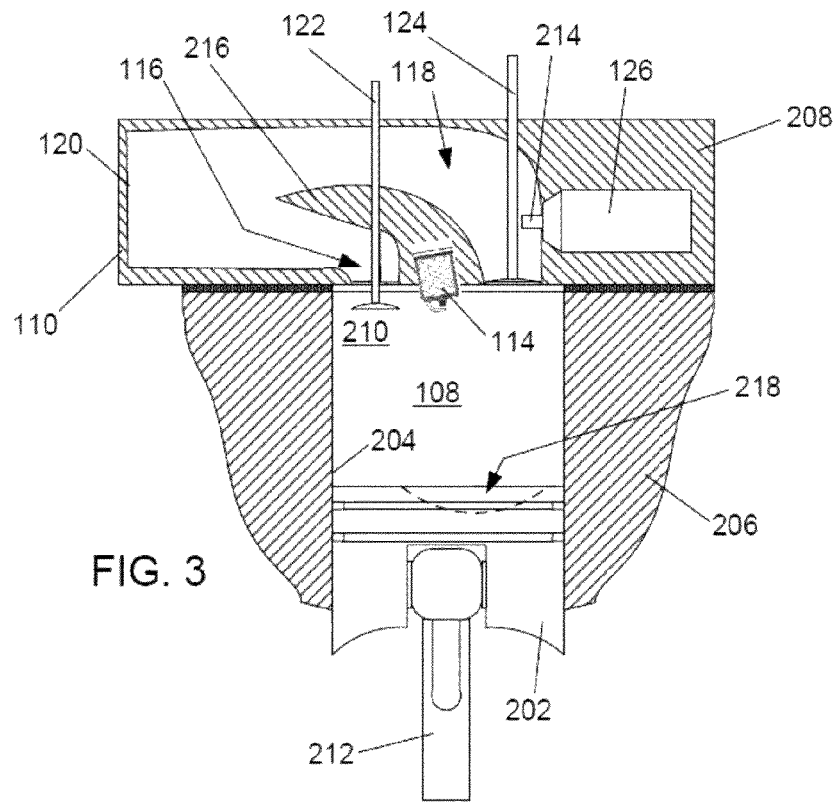
Figure 4:
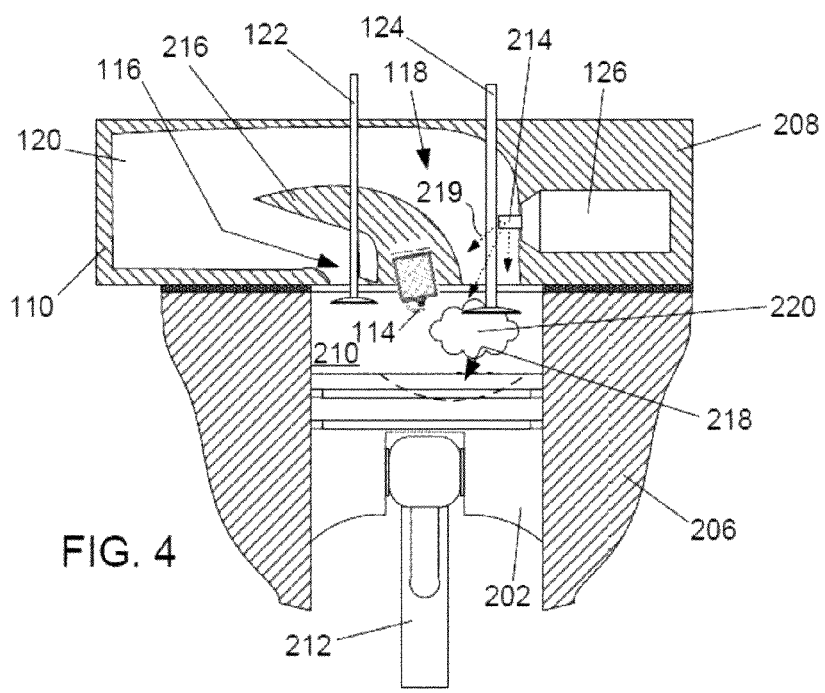

FIG. 2 is a cross section of a cylinder 108. FIGS. 3 and 4, as will be discussed in more detail below, are cross sections of the cylinder 108 at two different operating conditions. In the description that follows, structures or elements that are the same or similar to corresponding structures and elements already described are denoted by the same reference numerals as previously used. Accordingly, each cylinder 108 includes a piston 202 configured to reciprocate within a bore 204 formed in an engine crankcase 206. A cylinder head 208 is disposed over the open end of the bore 204 to define a combustion chamber 210. The reciprocating motion of the piston 202 changes the volume of the combustion chamber 210, which is maximum when the piston 202 is at a lowermost position or bottom dead center (BDC) and minimum when the piston 202 is at a topmost position or top dead center (TDC). The BDC and TDC positions of the piston 202 are determined based on the relative position of a connecting rod 212 onto an eccentric pin of a crankshaft (not shown). The connecting rods 212 are pivotally connected to the pistons 202 to transform, in the known fashion, the reciprocal motion of the pistons 202 into rotary motion of the crankshaft.

In the illustrated embodiment, the intake manifold 110 is shown connected to a side face of the cylinder head 208 such that the intake plenum volume 120 is in fluid communication with the first and second intake ports 116 and 118. The first intake port 116 is selectively blocked from fluid communication with the combustion chamber 210 by the first intake valve 122. Similarly, the second intake valve 124 selectively fluidly blocks the combustion chamber 210 from the second intake port 118. As previously described, the fuel injector 126 is configured to inject fuel into the second intake port 118. In the embodiment illustrated, the fuel injector 126 includes a tip 214 having one or more nozzle openings (not shown) that can deliver fuel, for example, in a gaseous phase, for mixing with an airflow passing through the second intake port 118 and entering the combustion chamber 210 when the second intake valve 124 is at least partially open.

As shown, the first and second intake ports 116 and 118 are fluidly connected to the intake plenum volume 120 and extend in parallel circuit configuration between the intake plenum volume 120 and the combustion chamber 210. The first and second intake valves 122 and 124 are independently operated to selectively admit either air or a very lean air/fuel mixture into the combustion chamber 210 through the first intake port 116, and a very rich air/fuel mixture into the combustion chamber 210 through the second intake port 118 when the fuel injector 126 is active. In this way, the total amount of fuel and air present in mixture in the combustion chamber 210 may be arranged to provide a nearly stoichiometric combustion but with stratified layers or areas of different air/fuel concentration mixtures within the combustion chamber 210. A divider wall 216 may be present to separate at least a portion of each of the first and second intake ports 116 and 118 so that fuel injected into the second intake port 118 by the fuel injector 126 is substantially prevented from spilling, spraying, or otherwise entering into the first intake port 116.

The crown portion of the piston 202 in the embodiment illustrated further includes a concave shaped feature or bowl 218. The bowl 218 is configured to direct the rich air/fuel mixture entering the combustion chamber 210 through the second intake port 118 towards a region 220 that is adjacent or around the tip of the spark plug 114. In general, the shape of the bowl 218 will depend on the particular engine configuration as well as on the shape of other surrounding features and components, such as the shape of the first and second intake ports 116 and 118. In other words, the shape of the first and second intake ports 116, the shape of the bowl 218, the placement and orientation of the spark plug 114, the position of the piston 202 within the bore 204, and other parameters may be optimized to, together, provide stratification of the rich air/fuel mixture entering the combustion chamber 210 from the second intake port 118. The rich air/fuel mixture may this be urged to occupy the region 220 of the combustion chamber that is around the igniting spark from the spark plug 114. As can be appreciated, the unique conditions present for each engine application will require at least some analysis to determine various parameters, such as combustion swirl and turbulence within the combustion chamber 210, such that the stratification of the air/fuel mixture may be optimized. However, as compared to direct injection engines, the embodiments disclosed herein are advantageously configured to facilitate the stratification of the air/fuel mixture within the combustion chamber 210.

More specifically, each of the first and second intake valves 122 and 124 may be configured to operate independently from one another. Their operation may in accordance to a predetermined relationship or the operation of each may be independently determined in a variable fashion based on various engine operating parameters, such as fuel quality, temperature, engine speed, engine load, and others.

Figure 6:
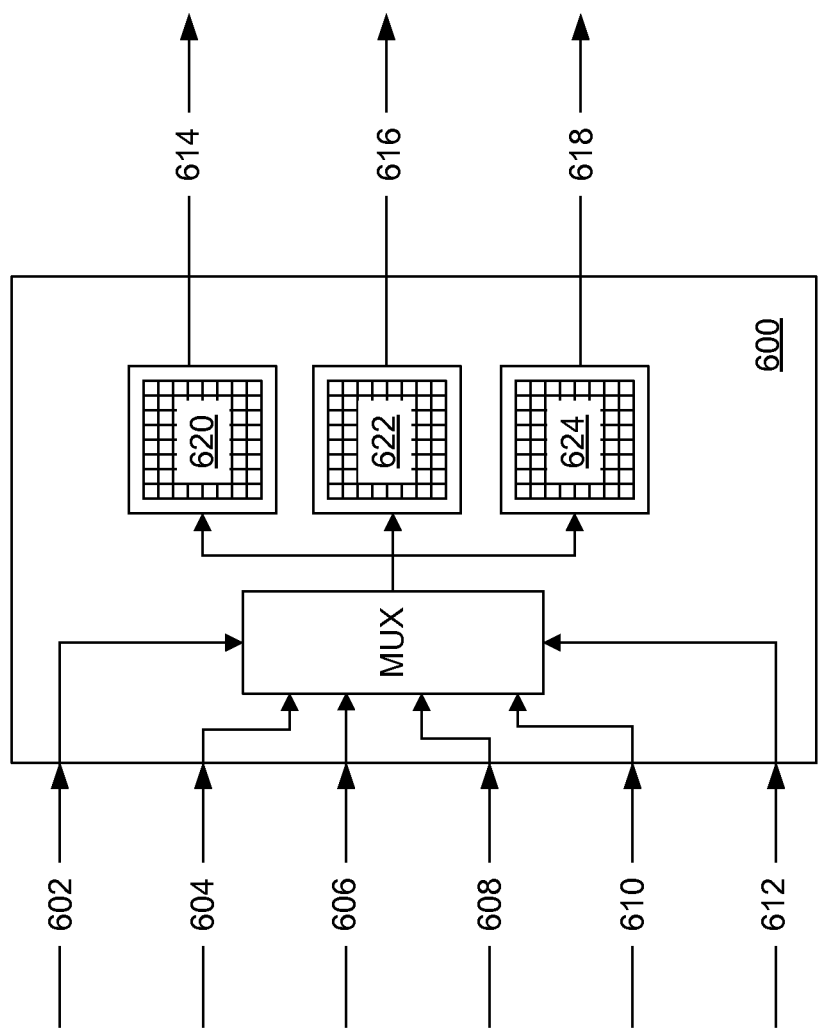
FIG. 6 is an intake valve timing chart in accordance with the disclosure.

A qualitative chart of valve timing for the first and second valves 116 and 118 is shown in FIG. 6. In this chart, a horizontal axis represents crank angle 502 in which the TDC and BDC positions of a piston are marked. Valve opening 504 is represented along the vertical axis. A full standard combustion cycle comprising an intake stroke 506, compression stroke 508, combustion or power stroke 510 and exhaust stroke 512 is shown in the chart for the sake of discussion, but those designations should not be construed as being limiting or as strictly descriptive of the occurrences within the combustion chamber 210.

Figure 5:
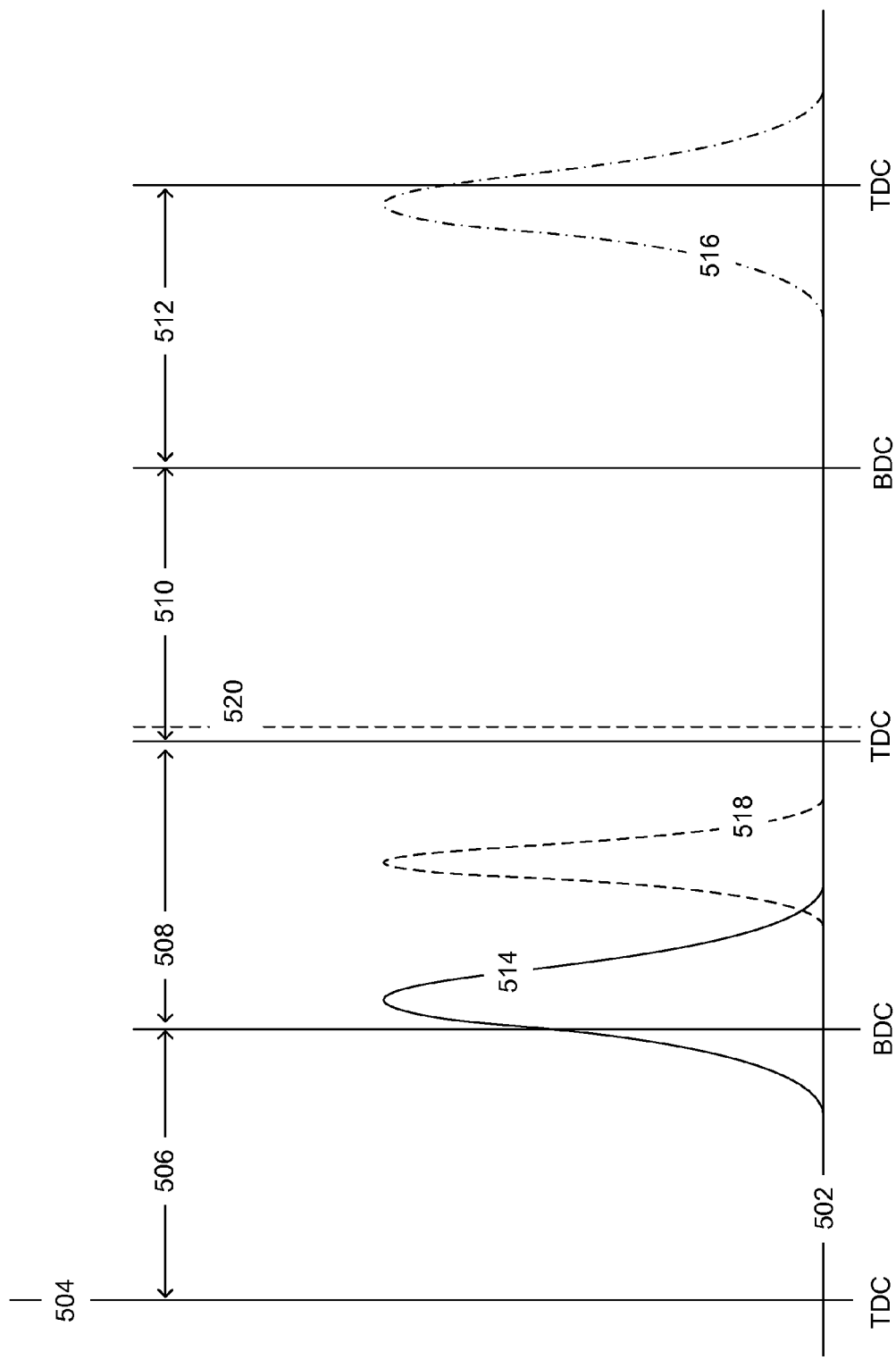
FIG. 5 is a block diagram for controller in accordance with the disclosure.

In the chart shown in FIG. 5, the piston travels from the TDC to the BDC positions in what typically represents the intake stroke 506. During this time, the volume of the combustion chamber is increased so that air or an air/fuel mixture may fill the combustion chamber. In the chart, a first intake valve position curve is shown in two alternative modes of operation. As can be seen, the first intake valve, for example, first intake valve 122, operates in accordance with a Miller cycle. A late inlet closing (LIC) mode of operation is represented by the LIC first intake valve position curve 514 (shown in solid line), and an early inlet closing (EIC) mode of operation is represented by the EIC first intake valve position curve 516 (shown in dashed line). In the LIC mode of operation, the first intake valve opens late in the intake stroke 506 and remains open for a portion of the compression stroke 508, as represented qualitatively by the LIC first intake valve position curve 514. Similarly, in the EIC mode of operation, the first intake valve may open during the exhaust stroke 512 and close early during the intake stroke 506. As previously described, the fluid entering the combustion chamber through the first intake port, such as intake port 116 shown in FIGS. 2-4, is advantageously either air or a very lean air/fuel mixture, which fills the combustion chamber 210 while the first intake valve is open.

The second intake valve opens relatively briefly during the compression stroke 508 as indicated by the second intake valve position curve 518. This operation of the second intake valve may be the same or similar regardless of the LIC or EIC mode of operation of the first intake valve. It should be appreciated that during the time the second intake valve, for example, the valve 124 shown in FIG. 204, is open, the static pressure of fluid within the corresponding intake port, for example, the second intake port 118, is higher than the static pressure of fluids present within the combustion cylinder at the time.

The opening of the second intake valve 124 is configured to at least partially coincide with the injection of fuel from the injector 126. As previously described, the injector 126 is arranged to inject a predetermined amount of fuel, which together with the total amount of air entering the combustion chamber 210 in the aggregate through the first and second intake valves 122 and 124 will produce a total air/fuel ratio by mass that is desired for the particular engine, such as a stoichiometric or a rich-burn stoichiometric mixture. However, the mode in which the fuel is distributed within the combustion chamber is stratified to promote more efficient combustion.

As is more particularly shown in FIGS. 3 and 4, the first intake valve 122 may open first to admit an amount of air into the combustion chamber 210. The operation of the first intake valve 122 may be in accordance with an LIC or EIC Miller mode of operation. The second valve 124 opens briefly to admit an additional amount of air as well as an amount of fuel 219 that is injected by the injector 126. The first and second valves 122 and 124 may have an overlap opening period, especially if the first intake valve 122 is operating in a LIC mode of operation, as shown, for example, by curve 514 in FIG. 5. The air incoming into the combustion chamber 210 through the second intake port 118 is in a fuel-rich air/fuel mixture, which is dissuaded from mixing with the air already present in the combustion chamber 210 by being appropriately routed by the shape of the second intake port 118 towards the bowl 218. The bowl 218 is optimized to redirect the fuel-rich mixture towards a region 220 located adjacent the tip of the spark plug 114. As previously described, the spark plug 114 may be oriented and positioned to protrude into the region 220 of the combustion chamber 210. In this way, the fuel-rich mixture is better positioned for a more complete burn in a shorter period when ignition is provided. Turning to FIG. 6, it can be also seen that an ignition event 520 may shortly follow the closing of the second intake valve 124 such that insufficient time is provided for the fuel-rich mixture to mix with the air present in the combustion chamber 210 prior to ignition.

A block diagram for a control system 600 is shown in FIG. 6. The control system may be one or more control algorithms operating within the controller 105 shown in FIG. 1. The controller 105 may be a single controller or may include more than one controller disposed to control various functions and/or features of a engine 100 and/or generator 104. For example, a master controller, used to control the overall operation and function of the system, may be cooperatively implemented with an engine controller. In this embodiment, the term "controller" is meant to include one, two, or more controllers that may be associated with the system and that may cooperate in controlling various functions and operations of the system. The functionality of the controller, while shown conceptually in FIG. 6 to include various discrete functions for illustrative purposes only, may be implemented in hardware and/or software without regard to the discrete functionality shown. Accordingly, various interfaces of the controller are described relative to components of the system shown in FIG. 1. Such interfaces are not intended to limit the type and number of components that are connected, nor the number of controllers that are described.

In the illustrated embodiment, the control system 600 receives various engine and other operating parameter inputs. As shown in the exemplary embodiment of FIG. 6, the control system 600 is disposed to receive signals indicative of engine speed 602, engine load 604, crankshaft or camshaft position or timing 606, air temperature 608, fuel quality 610, intake manifold pressure 612, and various other parameters as appropriate. Each of these parameters may be used in various calculations and other determinations to provide, relevant to the present discussion, a first intake valve timing 614, a second intake valve timing 616, and an ignition timing 618 among others. These parameters may be determined by any appropriate method, for example, a lookup table for determining the timing based on engine speed 602 and engine load 604, with appropriate corrections applied based on other parameters, such as crank timing 606, air temperature 608, fuel quality 610, boost pressure 612, and/or other parameters. Accordingly, the control system 600 includes a first sub-routine 620, which provides the first intake timing signal 614, a second sub-routine 622, which provides the second intake timing signal 616, and a third sub-routine 624, which provides the ignition timing signal 618. The particular operations within each sub-routine are configured to provide a desired intake valve timing for each of the independently controlled first and second intake valves, as well as a desired ignition timing, although other timing values may be determined, such as a desired fuel injection timing, and the like.

In one embodiment, each of the first and second intake valves may be operated by either dedicated camshafts or a single camshaft having dedicated lobes formed thereon that can provide the desired timing of intake valve opening and closing. In an alternative embodiment, the first and second intake valves may be operated by a dedicated or separable intake camshaft having the capability to vary the intake valve actuation initiation and termination events. In yet another alternative embodiment, each intake valve may be actuated by a dedicated actuators, such as an electric or hydraulic actuator, having a broad ability to selectively open and close each intake valve.

INDUSTRIAL APPLICABILITY

This disclosure generally relates to spark ignition internal combustion engines. The embodiments described herein specifically relative to stationary engines operating on natural gas, liquefied petroleum gas (LPG), biogas, or any other combustible fuel, and connected to electrical generators for the generation of electrical power, but any other type of engine may be used. Accordingly, although a stationary engine application is described, the systems and methods disclosed herein are applicable to engines installed in large equipment, such as locomotive or marine applications, as well as engines installed in vehicles, such as in the trucking or automotive industries.

The disclosed embodiments encompass a port fuel injected natural gas engine having two intake valves associated with each combustion cylinder. Each of the two intake valves operates independently from the other. During operation, one intake valve, which may operate in accordance with a late inlet closing (LIC) or early intake closing (EIC) Miller cycle, opens to admit charge air from a non-fuel injected intake port into a combustion cylinder of the engine. The second of the two valves opens late in the compression cycle of the engine to admit a relatively rich charge into the cylinder. This second valve is disposed in an intake port having a fuel injector configured to provide fuel to the air entering the combustion cylinder. In one embodiment, the addition of the rich air/fuel mixture is provided just prior to ignition of the air/fuel mixture. Additionally, the position of the fuel injector, the shape of the intake ports, and the shape of a piston crown are all optimized and configured to provide the rich air/fuel mixture in a vicinity of the spark plug. In this way, ignition of the air/fuel mixture is more efficient and avoids engine knocking as well as providing a more complete combustion of the fuel in the combustion chamber.

Figure 7:
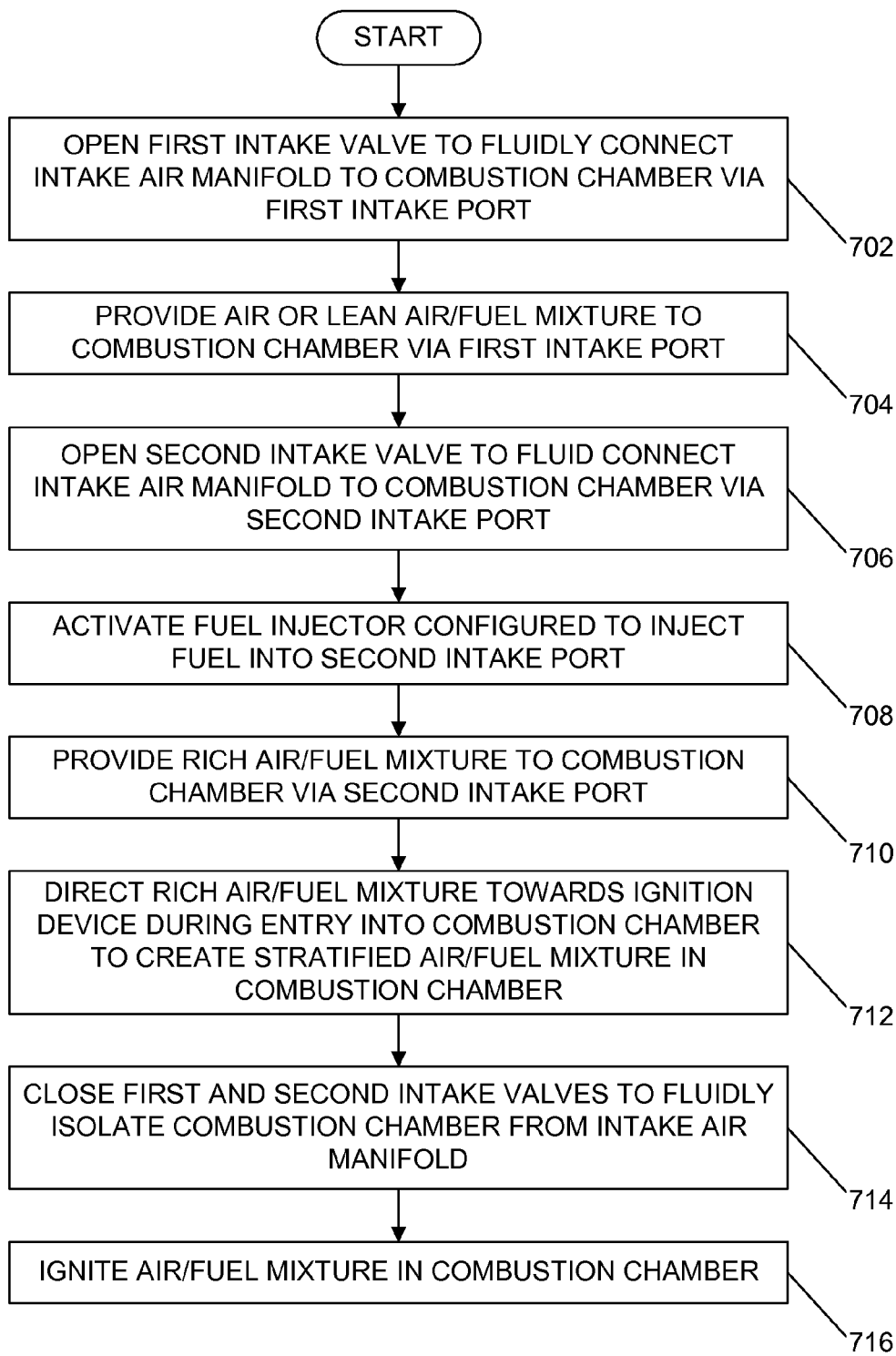
FIG. 7 is a flowchart for a method of operating an internal combustion engine in accordance with the disclosure.

A flowchart for a method of operating an internal combustion engine is shown in FIG. 7. The engine may include a single or multiple intake air plenum volumes that are configured to provide air to one or more combustion chambers. The method includes opening a first intake valve associated with a particular combustion chamber so that air from the intake air plenum is provided to the combustion chamber at 702. A first intake port fluidly interconnecting the intake air plenum and the combustion chamber via the first intake valve may be advantageously provided, although other configurations may be used. For example, in an engine operating under an EIC Miller cycle, a single intake valve may be disposed in a single intake port. In such embodiment, a fuel injector that may be disposed within the single air plenum may remain inactive during the admission of air or a very lean air/fuel mixture into the combustion chamber.

Following the opening of the first intake valve, air or a lean air/fuel mixture is provided via the first intake port to the combustion chamber at 704. In the event some amount of fuel is present in the first intake port, for example, left over from a previous injection event, the air passing through the first intake port may carry any such remaining fuel into the combustion chamber, although the resulting air/fuel mixture will be relatively lean.

A second intake valve is opened at 706 to fluidly connect the intake air plenum or manifold with the combustion chamber via a second intake port. As previously described, in an embodiment having a single intake valve disposed in a single intake port, the first and second intake valves as described herein merely represent first and second opening events of the single intake valve. In engines having two intake valves for each combustion chamber, for example, the engine 100 shown in FIG. 1, a dedicated intake port, for example, 116 and 118, may be used.

As shown in FIG. 1, a fuel injector 126 may be configured to selectively provide fuel to the second intake port 118. In general, the method includes activation of a fuel injector providing fuel to the second intake port at 708 concurrently with or immediately following opening of the second intake valve. In this way, a relatively rich air/fuel mixture is provided to the combustion chamber via the second intake port at 710.

The rich air/fuel mixture is directed towards an ignition device, for example, a spark plug, at it enters into the combustion chamber to provide a stratified total air/fuel mixture in the combustion chamber at 712. In other words, although the total amount of air and the total amount of fuel in the combustion chamber following the addition of the rich air/fuel mixture may be close to a preselected air/fuel ratio, such as a ratio consistent with a close to stoichiometric combustion, the air/fuel mixture in the combustion chamber is not homogeneous during and immediately after the addition of the rich air/fuel mixture. More specifically, the second intake port and other features of the engine, such as a specially formed combustion bowl in the crown of a piston, may be used to generally direct the fuel-rich air/fuel mixture to a region of the combustion chamber that is adjacent the source of ignition. Thus, rich and lean areas may exist in the combustion chamber before ignition is provided. This stratification of the air/fuel mixture in the combustion chamber, which is accomplished with the staged and selectively controlled addition of air and fuel into the combustion cylinder, advantageously provides more complete combustion and higher fuel efficiency to the engine.

Following the creation of the stratified air/fuel mixture as described, the first and second intake valves may be closed in a desired sequence and timing at 714, and the air/fuel mixture is ignited at 716. Although the opening of the second intake valve occurs after the opening of the first intake valve, the closing of each of the valves may not follow a particular order. In the illustrated embodiment, the first intake valve may operate in either an LIC or EIC Miller cycle. During operation of the first intake valve in an EIC Miller cycle, the first intake valve may open before the beginning of an intake stroke of the engine, and may close before a compression stroke begins. Thus, the intake valve may be closed before the second intake valve is opened. The second intake valve is intended to provide the rich air/fuel mixture, which to maintain the stratification of the air/fuel mixture in the combustion chamber advantageously involves opening and closing the second intake valve entirely within the compression stroke of the engine, with the closing occurring as soon as possible before ignition.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The invention claimed is:

1. An internal combustion engine, comprising:
   a combustion chamber at least partially defined within a cylinder bore by a reciprocating piston having a piston crown with a concave bowl, said concave bowl being offset with respect to a centerline of the reciprocating piston;
   an intake plenum;
   a first intake port;
   a second intake port disposed adjacent one diametrical end of a cross section of the combustion chamber;
   a fuel injector disposed in the second intake port and operable to deliver a preselected amount of fuel therein to mix with air from the intake plenum and form a rich air/fuel mixture;
   a first intake valve configured to selectively fluidly connect the intake plenum with the combustion chamber through the first intake port to provide one of air and a lean air/fuel mixture to the combustion chamber;
   a second intake valve configured to selectively fluidly connect the intake plenum with the combustion chamber through the second intake port to provide a stream of the rich air/fuel mixture to the combustion chamber, the second intake valve configured to actuate at a timing independent of the first intake valve; and
   an ignition device positioned in the combustion chamber,
   wherein the concave bowl is disposed adjacent to the one diametrical end of the combustion chamber, aligned with the second intake port, and disposed to directly receive therein the stream of the rich air/fuel mixture from the second intake port such that the concave bowl directs the rich air/fuel mixture towards the ignition device to create a stratified air/fuel mixture in the combustion chamber prior to combustion.

2. The internal combustion engine of claim 1, wherein the first intake valve is configured to operate under at least one of a late inlet closing (LIC) and an early inlet closing (EIC) Miller cycle.

3. The internal combustion engine of claim 2, wherein the fuel injector is operable to deliver the preselected amount of fuel when the second intake valve is open to provide the rich air/fuel mixture in the combustion chamber.

4. The internal combustion engine of claim 1, further comprising an electronic controller operably associated with the fuel injector and the ignition device, the electronic controller configured to provide a fuel injection signal to the fuel injector and an ignition signal to the ignition device based on at least one engine operating parameter.

5. The internal combustion engine of claim 4, wherein the at least one engine operating parameter includes at least one of engine speed, engine load, crank timing, air temperature, fuel quality and boost pressure.

6. The internal combustion engine of claim 1, wherein the second intake valve is configured to open and close during the compression stroke of the engine.

7. The internal combustion engine of claim 1, further comprising a camshaft operatively connected to open and close the first intake valve and the second intake valve at different times in the engine 8. The internal combustion engine of claim 1, further comprising:
   a first intake valve actuator configured to actuate the first intake valve; and
   a second intake valve actuator configured to actuate the second intake valve independently of the first intake valve.

9. An internal combustion engine including a plurality of cylinders defined by a plurality of crankcase bores and at least one cylinder head, each cylinder containing a reciprocable piston having a piston crown and defining a combustion chamber, each combustion chamber being fluidly connected to an intake plenum by a first intake port having a first intake valve and a second intake port having a second intake valve, the first and second intake valves configured to selectively fluidly connect the combustion chamber with the intake plenum, the engine comprising:
   a fuel injector associated with the second intake port and configured to selectively deliver a gaseous fuel into the second intake port that mixes with air passing through the second intake port to form a rich air/fuel mixture that enters the combustion chamber when the second intake valve is at least partially open;

an ignition device disposed at least partially in the at least one cylinder head and protruding into the combustion chamber; and a piston bowl defined in the piston crown in an offset location with respect to a centerline of the reciprocable piston and disposed adjacent to one diametrical end of the piston crown in substantial alignment with the second intake port, the piston bowl configured to directly receive therein a stream of the rich air/fuel mixture provided via the second intake port and direct the rich air/fuel mixture towards the ignition device, wherein the first intake valve is configured to operate independently from the second intake valve such that one of air and a lean air/fuel mixture is provided to fill the combustion chamber through the first intake port when the first intake valve is open, and wherein the second intake port and fuel injector are configured to direct the rich air/fuel mixture provided to the combustion chamber when the second intake valve is open into the piston bowl to be directed by the piston bowl towards the ignition device.

10. The internal combustion engine of claim 9, wherein the first intake valve operates under at least one of a late inlet closing (LIC) and an early inlet closing (EIC) Miller cycle.

11. The internal combustion engine of claim 9, wherein the piston bowl has a concave shape.

12. The internal combustion engine of claim 9, further comprising an electronic controller operably associated with the fuel injector and the ignition device, the electronic controller configured to provide a fuel injection signal to the fuel injector and an ignition signal to the ignition device based on at least one engine operating parameter.

13. The internal combustion engine of claim 12, wherein the at least one engine operating parameter includes at least one of engine speed, engine load, crank timing, air temperature, fuel quality and boost pressure.

14. A method for operating an internal combustion engine, comprising:

opening a first intake valve to fluidly connect an intake air plenum of the engine to a combustion chamber via a first intake port;

providing one of air and a lean air/fuel mixture to the combustion chamber via the first intake port;

opening a second intake valve to fluidly connect the intake air plenum with the combustion chamber via a second intake port;

activating a fuel injector configured to inject a gaseous fuel into the second intake port;

mixing air passing through the second intake port with fuel injected into the second intake port to form a rich air/fuel mixture;

providing the rich air/fuel mixture to the combustion chamber via the second intake port when the second intake valve is at least partially open;

directing the rich air/fuel mixture towards a concave bowl formed in a piston crown that at least partially defines the combustion chamber as the rich air/fuel mixture enters the combustion chamber, wherein the concave bowl is offset with respect to a centerline of the piston and disposed adjacent one diametrical end of a cross section of the combustion chamber in substantial alignment with the rich air/fuel mixture entering the combustion chamber such that the rich air/fuel mixture directly enters the concave bowl;

redirecting a flow of the rich air/fuel mixture with the concave bowl towards an ignition device; and closing the first and second intake valves before igniting a fuel/air mixture present in the combustion chamber with the ignition device.

15. The method of claim 14, further comprising creating a stratified air/fuel charge in the combustion chamber before ignition by discouraging homogeneous mixing of the rich air/fuel mixture with fluids present in the combustion chamber.

16. The method of claim 14, further comprising operating the first intake valve in accordance with a late inlet closing (LIC) Miller cycle.

17. The method of claim 14, further comprising operating the first intake valve in accordance with an early inlet closing (EIC) Miller cycle.

18. The method of claim 14, further comprising opening and closing the second intake valve during a compression stroke of the engine.

19. The method of claim 14, further comprising at least one of activating the fuel injector and providing an ignition to the combustion chamber based on at least one engine operating parameter, the at least one engine operating parameter including at least one of engine speed, engine load, crank timing, air temperature, fuel quality and boost pressure.

* * * * *